(12) United States Patent
Fraser

(10) Patent No.: US 6,677,720 B2
(45) Date of Patent: Jan. 13, 2004

(54) CONTROL SYSTEM FOR VEHICLE SEAT

(75) Inventor: Peter Gordon Fraser, Bracebridge (CA)

(73) Assignee: Dura Global Technologies, Inc., Rochester Hills, MI (US)

(*) Notice: Subject to any disclaimer, the term of this patent is extended or adjusted under 35 U.S.C. 154(b) by 166 days.

(21) Appl. No.: 09/877,947

(22) Filed: Jun. 8, 2001

(65) Prior Publication Data

US 2002/0185985 A1 Dec. 12, 2002

(51) Int. Cl.[7] .............................. H02P 3/00; H02P 7/00
(52) U.S. Cl. ...................... 318/445; 318/268; 318/280; 318/469; 318/468; 318/467; 318/568; 318/603; 297/284
(58) Field of Search ................................ 318/445, 469, 318/603, 467, 280, 568, 468, 268, 432, 434; 297/284

(56) References Cited

U.S. PATENT DOCUMENTS

| | | | |
|---|---|---|---|
| 4,284,935 A | | 8/1981 | March |
| 4,467,252 A | * | 8/1984 | Takeda et al. .............. 318/603 |
| 4,659,145 A | | 4/1987 | Obersteiner |
| 4,669,780 A | | 6/1987 | Sakakibara |
| 4,807,715 A | | 2/1989 | Nagashima |
| 4,888,535 A | | 12/1989 | Brusasco |
| 5,097,185 A | * | 3/1992 | Ogasawara .................. 318/268 |
| 5,130,622 A | * | 7/1992 | Takizawa et al. ........... 618/265 |
| 5,285,139 A | * | 2/1994 | Ogasawara .................. 318/466 |
| 5,319,248 A | * | 6/1994 | Endou ........................ 307/10.1 |
| 5,751,129 A | * | 5/1998 | Vergin ........................ 318/467 |
| 5,765,916 A | | 6/1998 | Patel |
| 5,812,399 A | * | 9/1998 | Judic et al. ............. 364/424.05 |
| 5,903,122 A | | 5/1999 | Mesnage |
| 5,965,993 A | | 10/1999 | Bak et al. |
| 6,037,731 A | * | 3/2000 | Fruehauf et al. ............. 318/468 |
| 6,195,603 B1 | * | 2/2001 | Gauger et al. ................ 701/49 |
| 6,320,341 B1 | * | 11/2001 | Oka et al. .................... 318/486 |

* cited by examiner

Primary Examiner—Robert E. Nappi
Assistant Examiner—Tyrone W Smith
(74) Attorney, Agent, or Firm—Richard M. Mescher; Casimir R. Kiczek

(57) ABSTRACT

A vehicle seat includes a seat movable along a path a motor for driving the seat on the path, a sensor generating a signal indicating movement of the seat on the path, and a controller operating the motor to move said seat along the path. The sensor is preferably a Hall-effect device or a potentiometer. The controller is in communication with the sensor to receive the signal and form a feed-back control loop. The controller accelerates the seat at a controlled rate of acceleration to a controlled constant speed and decelerates the seat from the constant speed at a controlled rate of deceleration. The controller controls the rate of acceleration of the seat at a stored predetermined rate of acceleration by adjusting operation of the motor to maintain the predetermined rate of acceleration. The controller controls the constant speed of the seat by determining an actual speed of the seat utilizing the feedback control loop, comparing the actual speed to a stored predetermined constant speed, and adjusting operation of the motor to maintain the actual speed substantially equal to the predetermined constant speed. The controller controls the rate of deceleration of the seat at a stored predetermined rate of deceleration by adjusting operation of the motor to maintain the predetermined rate of deceleration.

20 Claims, 3 Drawing Sheets

CONTROL SYSTEM FOR VEHICLE SEAT

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a control system for controlling movement of a powered vehicle seat and, more particularly, to such a control system which provides controlled rates of acceleration, speed and deceleration during movement of the seat.

BACKGROUND OF THE INVENTION

Adjustable seat assemblies for vehicles typically provide for a seat to be moved or adjusted in a forward/rearward direction along a pair of spaced apart track assemblies. Each track assembly typically includes a first track member which is mounted to the vehicle and a second track member which is supported for movement relative to the first track member. The first and second track members are usually mounted in a horizontal configuration with bearing members located on sides of the first and second tracks. The seat is adjusted in the forward/rearward direction by sliding the second track members relative to the first track members. This is often referred to as a "two-way" adjustable seat. The Adjustable seat assembly can also provide for the seat to be moved or adjusted in a upward/downward direction. The seat is usually adjusted in an upward/downward direction by raising/lowering the track assemblies. This is often referred to as a "four-way" adjustable seat. The adjustable seat assembly can additionally provide for a seat back to be pivoted or adjusted in a forward/rearward direction relative to a seat bottom. This is often referred to as a "six-way" adjustable seat. The adjustable seat assembly can further provide for the forward and rearward edges of the seat bottom to be moved or adjusted in a upward/downward direction independently of each other. This is often referred to as an "eight-way" adjustable seat. Of course, any combination of the above-described seat adjustments can be utilized in particular vehicle seat.

Powered adjustable seats use motor drive assemblies to make the various adjustments. The total number of motor assemblies typically depends of the number of ways the seat assembly is adjustable. For example, a two-way adjustable seat typically has a single motor assembly including at least one bi-directional electric motor that rotates a pair of drive shafts connected to gear assemblies mounted on the second track members. While these known powered adjustable seats may adequately perform their desired functions, they have a number of drawbacks. Most notably, the seats are moved in an uncontrolled manner. That is, power is supplied to the motor in a predetermined manner to move the seat and the power is not adjusted in real-time based the actual movement of the seat. As a result, actual movement of the seat varies depending on loading and other conditions and may or may need be in a desired manner. Accordingly, there is a need in the art for an improved powered vehicle seat assembly.

SUMMARY OF THE INVENTION

The present invention provides a control system for a vehicle seat which overcomes at least some of the above-noted problems of the related art. According to the present invention, a vehicle seat includes, in combination, a seat movable along a path, a motor for driving the seat on the path, a sensor generating a signal indicating movement of the seat on the path, and a controller activating the motor to move the seat along the path. The controller is in communication with the sensor to receive the signal from the sensor and form a feed-back control loop. The controller causes the seat to accelerate at a controlled predetermined rate of acceleration to a controlled predetermined constant speed and decelerate from the controlled predetermined constant speed at a controlled predetermined rate of deceleration.

According to another aspect of the present invention, a vehicle seat assembly includes a seat movable along a path, a motor for driving the seat on the path, a sensor generating a signal indicating movement of the seat on the path, a controller operating the motor to move the seat along the path and in communication with the sensor to receive the signal to form a feed-back control loop. The controller accelerates the seat at a controlled rate of acceleration by a stored predetermined rate of acceleration and adjusts operation of the motor to maintain the predetermined rate of acceleration.

According to yet another aspect of the present invention, a vehicle seat assembly includes a seat movable along a path, a motor for driving the seat on the path, a sensor generating a signal indicating movement of the seat on the path, a controller operating the motor to move the seat along the path and in communication with the sensor to receive the signal to form a feed-back control loop. The controller is adapted to accelerate the seat at a controlled rate of acceleration to a controlled constant speed and decelerates the seat from the constant speed at a controlled rate of deceleration. The controller is adapted to control the rate of acceleration of the seat by a stored predetermined rate of acceleration and adjust operation of the motor to maintain the predetermined rate of acceleration. The controller is adapted to control the constant speed of the seat by determining an actual speed of the seat utilizing the feedback control loop, comparing the actual speed to a stored predetermined constant speed, and adjusting operation of the motor to maintain the actual speed substantially equal to the predetermined constant speed. The controller is adapted to control the rate of deceleration of the seat by a stored predetermined rate of deceleration and adjust operation of the motor to maintain the predetermined rate of deceleration.

From the foregoing disclosure and the following more detailed description of various preferred embodiments it will be apparent to those skilled in the art that the present invention provides a significant advance in the technology and art of powered vehicle seats. Particularly significant in this regard is the potential the invention affords for providing a high quality, reliable, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
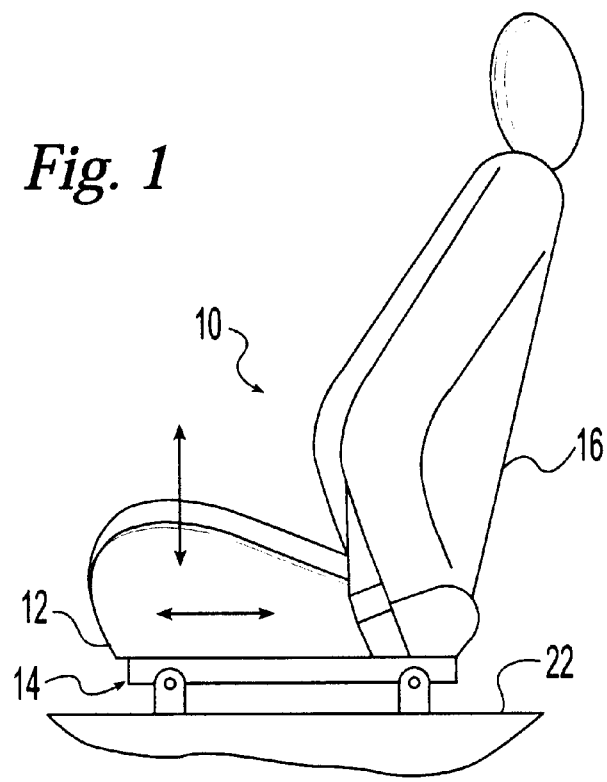
FIG. 1 is a side elevational view of a vehicle seat assembly having a track mounting system.

It should be understood that the appended drawings are not necessarily to scale, presenting a somewhat simplified representation of various preferred features illustrative of the basic principles of the invention. The specific design features of a control system for a vehicle seat as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the vehicle seat assembly illustrated in the drawings. In general, up or upward refers to an upward direction within the plane of the paper in FIG. 1 and down or downward refers to a downward direction within the plane of the paper in FIG. 1. Also in general, fore or forward refers to a direction toward the front of the vehicle, that is, to the left within the plane of the paper in FIG. 1 and aft or rearward refers to a direction toward the rear of the vehicle, that is, to the right within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved control system for a vehicle seat disclosed herein. The following detailed discussion of various alternative and preferred embodiments will illustrate the general principles of the invention with reference to a preferred embodiment. Other embodiments suitable for other applications will be apparent to those skilled in the art given the benefit of this disclosure.

Referring now to the drawings, FIG. 1 schematically shows a vehicle seat assembly 10 according to a preferred embodiment of the present invention. The illustrated vehicle seat assembly 10 includes a seat bottom 12 which is mounted within a vehicle on a mounting assembly 14. A seat back 16 is supported with respect to the bottom 12. The illustrated seat assembly 10 is a "four-way" adjustable seat providing horizontal fore/aft and vertical up/down adjustment. It is understood, however, that the present invention described herein can be utilized with a power seat adjuster which includes only one of these movements or adjustments described above such as, for example, a horizontal fore/aft movement by itself, or one or both of these movements or adjustments in combination with any number of additional movements or adjustments such as, for example, independent movement of each of the front and rear edges of the seat bottom and/or pivotal movement of the seat back with respect to the seat bottom, each of which can also be used separately.

Figure 2:
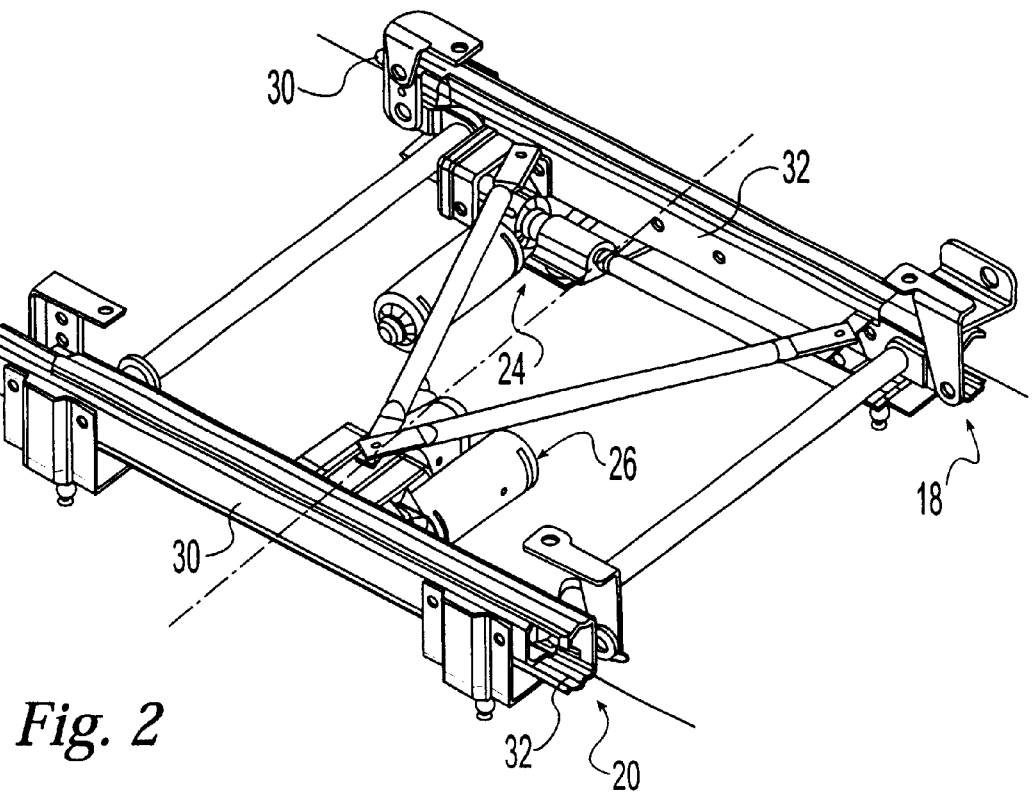
FIG. 2 is an enlarged perspective view of the track mounting system of FIG. 1 with the seat bottom and seat back removed for clarity.

As best shown in FIG. 2, the mounting assembly 14 includes an inboard track assembly 18 and an outboard track assembly 20 which are substantially parallel and laterally spaced apart. The inboard and outboard track assemblies 18, 20 are mounted to a vehicle structure 22 such as a vehicle floor. The terms inboard an outboard are used in this description for clarity and illustration purposed only and cannot be considered limiting.

Each track assembly 18, 20 includes a first track 30 and a second track 32. The first track 30 is preferably an upper or inner track that is fixedly mounted to the vehicle structure 22. The second track 32 is preferably an upper or inner track that is supported by the first track 30 so that the second track 32 can be moved in a forward or rearward direction relative to the first track. The terms inner, outer, forward, rearward, upper, lower, as used in this description are for illustrative purposes only and cannot be considered limiting.

A horizontal drive motor assembly 24 is mounted to one of the track assemblies 18, 20. The horizontal drive motor assembly 24 moves the second tracks 32 relative to the first tracks 30 to adjust the horizontal position of the seat bottom 12. A vertical drive motor assembly 26 is also mounted to one of the track assemblies 18, 20. The vertical drive motor assembly 26 adjusts the vertical position of the seat bottom 12. The drive motors are preferably D.C. motors.

Figure 3:
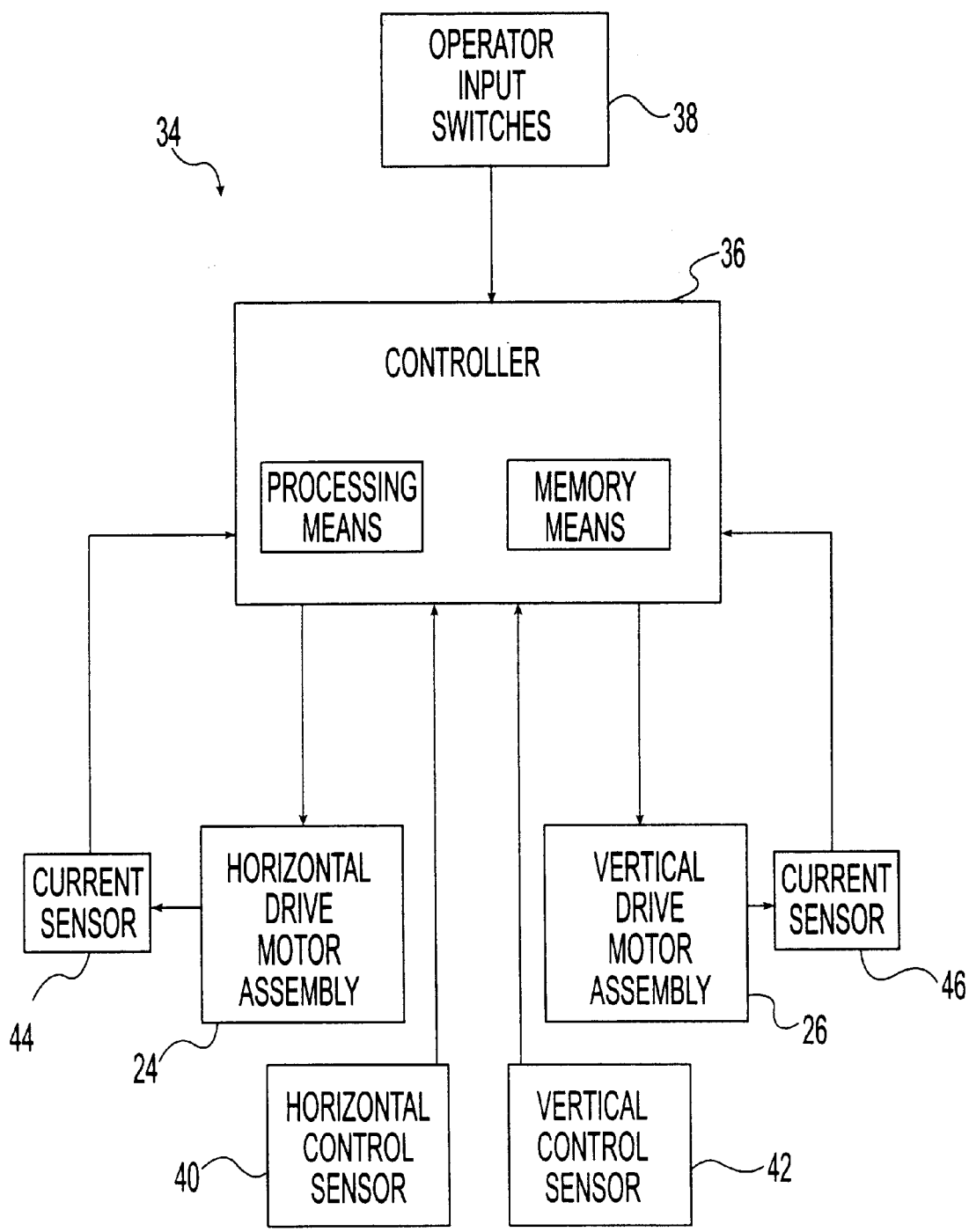
FIG. 3 is a schematic view of a control system of the vehicle seat assembly of FIGS. 1 and 2.

As best shown in FIG. 3, the adjustable seat assembly 10 includes a control system 34. The control system 34 includes a controller 36, operator input switches 38, the drive motors 24, 26, and control sensors 40, 42. The controller 36 is preferably in the form of a microprocessor which executes a control program stored in memory. The memory may be of any known type used with microprocessors and may include RAM and/or ROM memory elements. The illustrated embodiment includes a common controller 36 for all of the drive motors 24, 26 and controls each of the seat adjustments. However, it is noted that separate controllers can be utilized for one or more drive motors of the seat assembly.

Motor drivers are preferably connected to the drive motors 24, 26 and receive control signals from the controller 36. The motor drivers include circuitry for converting control signals from the controller 36 to control the flow of current in either of two directions to select the direction of rotation of the output shafts of the drive motors 24, 26. The motor drivers can be separate from the controller 36, such as attached to the drive motors 24, 26, or alternatively integral with the controller 36.

The operator input switches 38 can include switches of any suitable known type such as, for example, a two-position switch for fore and aft movement and a two-position switch for up and down movement. Preferably, there is at east one memory switch provided to move the seat to a preferred position of the operator which the operator can store in the memory of the controller 36.

The horizontal control sensor 40 is adapted to provide an output signal indicating the horizontal position of the vehicle seat. The control sensor 40 can be of any known suitable type which provides output signals such as pulses or voltages in response to rotation or movement of a component such as, for example, a Hall-effect device or a potentiometer. The control sensor 40 can be mounted near or on the drive motor 24 so that it provides a varying signal depending on rotation of the output shaft of the motor 24. The control sensor 40 can generate at least one, and possibly multiple, output signals for each full rotation of the output shaft of the motor 24. The control sensor 40 can be alternatively mounted on or near one of the first and second tracks 30, 32 so that it provides a varying output signal depending on the horizontal position of the second tracks 32 relative to the first tracks 30. The control sensor 40 is preferably connected to the controller 36 so that these output signals are input to the controller 36. Connected in this manner, the control sensor 40 forms a feed-back control loop which can be utilized to control horizontal movement of the seat.

The vertical control sensor 42 is adapted to provide an output signal indicating the vertical position of the vehicle seat. The control sensor 42 can also be of any known suitable type which provides output signals such as pulses or voltages in response to rotation or movement of a component such as, for example, a Hall-effect device or a potentiometer. The control sensor 42 can be mounted near or on the drive motor 26 so that it provides a varying signal depending on rotation of the output shaft of the motor 24. The control sensor 40 can generate at least one, and possibly multiple, output signals for each full rotation of the output shaft of the motor 24. The control sensor 42 can be alternatively mounted on or near mounting assembly components so that it provides a varying output signal depending on the vertical position of the seat. The control sensor 42 is preferably connected to the controller 36 so that these output signals are input to the controller 36. Connected in this manner, the control sensor 42 forms a feed-back control loop which can be utilized to control vertical movement of the seat.

The output signals from the control sensors 40, 42 are utilized by the controller 36 to provide a count or digital representation of the actual displacement position of the seat drive elements between extreme positions of travel such as, for example, a full forward end of travel limit and a full rearward end of travel limit. The end of travel limits are prestored in memory of the controller 36 as counts or digital representations such as, for example, a count of "zero" for the full forward end of travel limit and a count of "x" for the full rearward end of travel limit such that "x" is the total number of counts for the full travel length. The output signals from the control sensors 40, 42 are continually stored as accumulated counts or digital representations by the controller in memory to provide a known indication of the last and/or current positions of the vehicle seat. For example, the controller 36 has an indication of the exact current position of the horizontal drive elements and thus the horizontal fore aft position of the seat relative to a known reference based on the accumulated count digital representation of output signals that the controller 36 receives from the control sensor 40 during horizontal movement of the seat.

The output signals of the control sensors 40, 42 are used by the controller 36 to control movement of the seat. Preferably, the controller 36 is adapted to cause the seat to accelerate at a controlled predetermined rate of acceleration from a stop to a controlled predetermined constant speed and decelerate from the controlled predetermined constant speed at a controlled predetermined rate of deceleration to a stop. The acceleration, speed and deceleration of the seat are controlled by the controller 36 via the feed-back control loop formed by the control sensors 40, 42. The controller 36 preferably continuously monitors movement of the seat via the feed back control loop and adjusts operation of the drive motors 24, 26 to obtain/maintain the desired movement of the seat. The controller is preferably adapted to control the rate of acceleration by a predetermined rate of acceleration stored in memory and adjust operation of the motor to maintain the stored predetermined rate of acceleration. The controller is also preferably adapted to control the constant speed of the seat by determining an actual speed of the seat utilizing the feedback control loop, comparing the actual speed to a predetermined constant speed stored in memory, and adjusting operation of the motor to maintain the actual speed substantially equal to the stored predetermined constant speed. The controller is further preferably adapted to control the rate of deceleration of the seat by a predetermined rate of deceleration stored in memory and adjust operation of the motor to maintain the predetermined rate of deceleration. By utilizing a feed-back loop to actively control movements of the seat, desired movements can be obtained even under varying loading and other conditions.

Preferably, the controller 36 uses pulse width modulation to power the drive motors 24, 26. That is, power is supplied to the drive motors 24, 26 in pulses and motor output is controlled by the controller 36 varying the duty cycle of the power supplied to the drive motors 24, 26. The seat can be accelerated by stepping or ramping up the duty cycle of the supplied power. A constant speed of the seat can be maintained by continuously adjusting the duty cycle of the supplied power to maintain the desired speed even under changing loads and conditions. The seat can be decelerated by stepping or ramping down the duty cycle of the supplied power.

Because the controller 36 knows the current position of the seat and the extreme end of travel limits, the controller 36 can advantageously be programmed with "soft stop" locations which are short of physical stops at the extreme end of travel limits. The stored soft stops permit the controller 36 to automatically deactivate the drive motor 24, 26 to stop the seat, in that particular adjustment direction, whenever a soft stop is reached and prior to engaging the physical stops. System life is increased by eliminating violent engagement the physical stops. Note that the controller 36 preferably begins to decelerate the seat at a controlled predetermined rate of deceleration at the prestored soft stop count or digital representation which is located an adequate distance from the physical stop to allow the seat to a stop, or nearly stop, prior to making contact with the physical stop.

The output signals from the control sensors 40, 42 can also be utilized to detect if an obstruction has been engaged by the seat during movement. For example, if the control sensors 40, 42 are hall-effect devices, the controller 36 can determine if an obstruction has been engaged by determining an amount of time between signal pulses received from the control sensors 40, 42. The determined time can be compared by the controller 36 to a predetermined maximum allowed time and/or a calculated expected time. If the determined time is greater, than an obstruction is deemed to be present and the controller 36 deactivates the drive motors 24, 26. If the control sensors 40, 42 are potentiometers, the controller 36 can determine if an obstruction has been engaged by determining a rate of change of the voltage signal form the control sensors 40, 42. The determined rate of change can be compared by the controller 36 to a predetermined maximum allowed rate of change and/or a calculated expected rate of change. If the determined rate of voltage change is greater, than an obstruction is deemed to be present and the controller 36 deactivates the drive motors 24, 26.

Motor current sensors 44, 46 can be provided to provide the controller 36 with an input signal indicating the motor current during activation of the drive motor 24, 26. A prestored maximum current is stored in the controller memory and compared by the controller with the actual motor current during operation of the drive motor 24, 26. In this way, the controller 36 can detect if an obstruction is encountered and immediately deactivate the drive motor 24, 26 and stop further movement of the seat. Additionally, A program set point can be stored in the controller memory so that the controller 36 can use the signals from the current sensors 44, 46 to limit maximum current draw of the controller 36.

If a user desires rearward horizontal movement of the seat, for example, the user engages the operator input switch 38 to initiate movement in the rearward direction and the controller 36 sends a control signal to the driver which supplies current to the drive motor 24 to cause the output shaft of the drive motor 24 to rotate in a direction to drive the horizontal drive elements in the rearward direction. The controller 36 ensures that the seat accelerates in a controlled predetermined rate until it reaches a controlled predetermined constant speed. As the motor 24 is operating, the controller 36 continuously determines if the predetermined speed is being maintained via the feed-back control loop and makes adjustments as needed to the power supplied to the drive motor 24 to maintain the predetermined speed. The controller 36 also continuously determines whether the seat has reached the soft stop at the rearward extreme end of travel limit. If the current count or digital representation from the control sensor 40 equals the prestored soft stop count or digital representation at the rearward end of travel limit, the controller 36 deactivates the drive motor 24. If the soft stop count or digital representation at the rearward end of travel limit has not been reached, the controller 36 determines if the operator input switch 38 is still engaged. When the operator input switch 38 is released, the controller 36 deactivates the motor and the last count or digital representation from the control sensor 40 is stored in memory as the last horizontal position of the seat. A similar sequence of events occurs when the operator initiates other movements.

Figure 4:
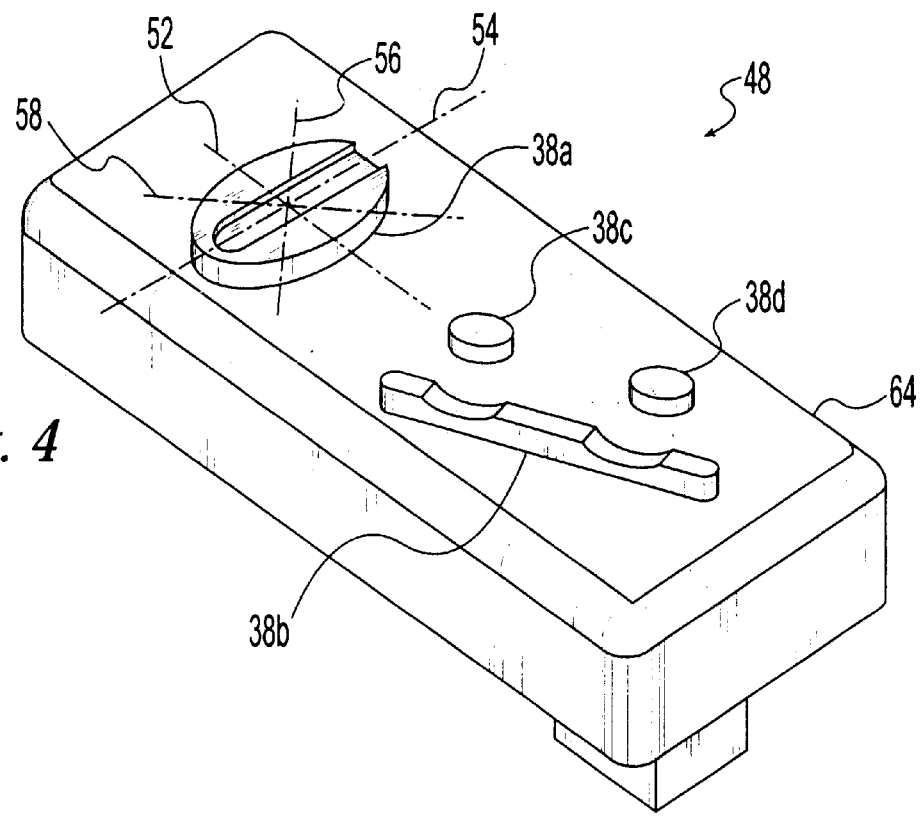
FIG. 4 is a perspective view of an operator input switch assembly.
Figure 5:
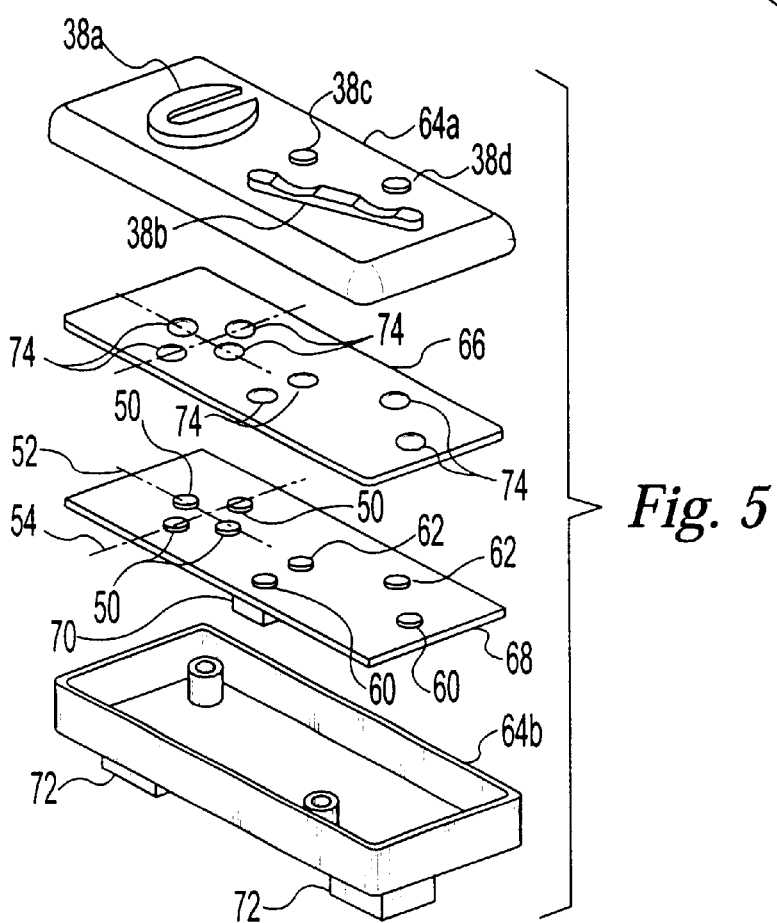
FIG. 5 is a perspective exploded view of the operator input switch assembly of FIG. 4.

FIGS. 4 and 5 illustrate a preferred operator input switch assembly 48 according to the present invention which is particularly adapted for use with an "eight-way" adjustable seat. It is noted that this switch assembly can be alternatively adapted for use with a "two-way", "four-way", or "six-way" adjustable seat. The switch assembly 48 includes a plurality of operator input switches 38 including a seat switch 38a, a recline/incline switch 38b, a first memory switch 38c, and a second memory switch 38d. The illustrated seat switch 38a includes four contact switches 50 to control "six way" adjustment of the seat. The seat switch 38a operates similar to a joy stick such that depression of one end engages a first one of the contact switches 50 to move the seat forward, depression of the other end engages a second one of the contact switches 50 to move the seat rearward, depression of one side engages a third one of the contact switches 50 to move the seat upward, and depression of the other side engages a fourth one of the contact switches 50 to move the seat downward. Preferably, the first and second contact switches 50 are provided along one axis 52 while the second and third contact switches 50 are provided along a second axis 54 which is substantially perpendicular to the first axis 52. Depression of the seat switch 38a at any of the four locations between the sides and ends, that is along axes 56, 58 located about midway between or 45 degrees between the perpendicular axes 52, 54, engages two of the switches 50 to move the front edge upward, the front edge downward, the rear edge upward, and the rear edge downward respectively. It is noted that the seat switch 38a advantageously controls "six-way" adjustment with the use of only four contact switches 50. Each of the various contact switches 50, 60, 62 of the assembly can be the illustrated dome switch pad type or alternatively any other suitable known switch type which can be board mounted.

The illustrated recline/incline switch 38b includes two contact switches 60 to control reclining and inclining of the seat. The illustrated recline switch 38b operates as a rocker switch so that depression of one end engages one of the contact switches 60 to recline the seat and depression of the other end engages the other contact switch 60 to incline the switch. The illustrated first and second memory switches 38c, 38d each include one contact switch 62 to move the seat to a position stored in memory. The first and second memory switches 38c, 38d operate as push button switches so that depression engages the contact switch 62 to move the seat to the stored location. It is noted that the assembly 48 can include a greater or lesser number of the memory switches 38c, 38d or no memory switches 38c, 38d.

The illustrated operator input switch assembly 48 includes a case 64 formed by top and bottom members 64a, 64b, dome switch pad 66, and a printed circuit board 68. The case 64 forms a hollow interior for containing and protecting the switch pad 66 and the printed circuit board 68. The case 64 can be formed in any suitable manner such as molded of a plastic material. The case top and bottom members can be connected together in any suitable manner such as snap-fit connections and/or mechanical fasteners. The printed circuit board is located within the case 64 and has the contact switches 50, 60, 62 mounted directly thereto on a top surface facing toward the case top member 64a. An electric circuit 70 is located on a bottom surface facing toward the case bottom member 64b. The circuit 70 is connected to suitable connectors 72 located at the bottom the case bottom member 64b for connecting the switch to the control system 34. The switch pad 66 is located within the case 64 between circuit board 68 and the case top member 64a. The switch pad is provided with suitable protrusions 74 such as the illustrated dome-shaped protrusions which are positioned at each of the contact switches 50, 60, 62. The switch pad 66 can be formed of rubber or other suitable flexible material. It is noted that by mounting the contact switches directly onto the printed circuit board 68, the quantity of required switch modules and harnesses can be eliminated. Preferably, the controller 36 is housed in the case 64 so that the system has a single circuit board 68. As a result add on modules are not required to add features. Additional features can be added by a surface mount controller which does not require additional wiring. For example, the controller 36 could additionally have other memory applications or motor sequencing applications for automatically folding and/or deploying "flip and fold" type seats.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A vehicle seat assembly comprising:
   a seat movable along a path;
   a motor for driving the seat on said path;
   a sensor generating a signal indicating movement of the seat on said path;
   a controller operating said motor to move said seat along said path and in communication with said sensor to receive said signal to form a feed-back control loop; and
   wherein said controller causes said seat to accelerate at a controlled rate of acceleration to a controlled speed and decelerate from the controlled speed at a controlled rate of deceleration;

wherein the controller adjusts the motor so that an actual rate of acceleration of the seat is maintained substantially equal to a predetermined rate of acceleration, adjusts the motor so that an actual speed of the seat is maintained substantially equal to a predetermined speed, and adjusts the motor so that an actual rate of deceleration of the seat is maintained substantially equal to a predetermined rate of deceleration.

2. The vehicle seat assembly according to claim 1, wherein said seat is movable along at least one additional path and further comprising:

at least one additional motor for driving the seat along the at least one additional path;

at least one additional sensor generating a signal indicating movement of the seat on said at least one additional path; and wherein the controller is in communication with said at least one additional sensor to receive said signal from said at least one additional sensor to form a feed-back control loop.

3. The vehicle seat assembly according to claim 1, wherein the controller supplies power to the motor using pulse width modulation to accelerate said seat at the controlled rate of acceleration, move said seat at the controlled speed, and to decelerate said seat at the controlled rate of deceleration by varying a duty cycle of the supplied power to the motor.

4. The vehicle seat assembly according to claim 1, wherein the sensor includes a Hall-effect device which senses at least one of the position of said seat relative to said path and rotation of an output shaft of said motor.

5. The vehicle seat assembly according to claim 1, wherein the sensor includes a potentiometer which senses at least one of the position of said seat relative to said path and rotation of an output shaft of said motor.

6. The vehicle seat assembly according to claim 1, wherein said controller is preprogrammed with soft stop locations and stops the seat upon reaching the soft stop locations prior to reaching extreme end of travel limits by engaging physical stops.

7. The vehicle seat assembly according to claim 1, wherein said controller receives signals from an operator input device to store at least one desired location in memory for said seat along said path.

8. The vehicle seat assembly according to claim 1, further comprising:

motor current sensor generating a signal indicating current being supplied to the motor during operation of the motor; and wherein said controller is adapted to detect if an obstruction has been engaged by said seat in said path by comparing the signal from the motor current sensor to a predetermined value of current for a predetermine amount of time and to deactivate the motor when an obstruction is detected.

9. The vehicle seat assembly according to claim 8, wherein said controller uses said signal from said motor current sensor to allow a program set point to limit maximum current draw of the controller.

10. The vehicle seat assembly according to claim 1, wherein said sensor is a hall-effect device providing signal pulses and said controller is adapted to detect if an obstruction has been engaged by said seat in said path by determining an amount of time between said signal pulses and to deactivate the motor when an obstruction is detected.

11. The vehicle seat assembly according to claim 1, wherein said sensor is a potentiometer providing a voltage signal and said controller is adapted to detect if an obstruction has been engaged by said seat in said path by determining a rate of change of voltage by the voltage signal and to deactivate the motor when an obstruction is detected.

12. The vehicle seat assembly according to claim 1, wherein said controller controls the controlled acceleration of the seat by determining an rate of acceleration of the seat, comparing the actual rate of acceleration to the predetermined rate of acceleration, and adjusting operation of the motor to maintain the actual acceleration substantially equal to the predetermined rate of acceleration.

13. The vehicle seat assembly according to claim 1, wherein said controller controls the controlled speed of the seat by determining an actual speed of the seat utilizing the feed-back control loop, comparing the actual speed to the predetermined speed, and adjusting operation of the motor to maintain the actual speed substantially equal to the predetermined speed.

14. The vehicle seat assembly according to claim 1, wherein said controller controls the controlled deceleration of the seat at by determining an actual rate of deceleration of the seat, comparing the actual rate of deceleration to the predetermined rate of deceleration, and adjusting operation of the motor to maintain the actual rate of deceleration substantially equal to the predetermined rate of deceleration.

15. A vehicle seat assembly comprising:

a seat movable along a path;

a motor for driving the seat on said path;

a sensor generating a signal indicating movement of the seat on said path;

a controller operating said motor to move said seat along said path and in communication with said sensor to receive said signal to form a feed-back control loop; and wherein said controller accelerates the seat at a controlled rate of acceleration by adjusting operation of the motor to maintain an actual rate of acceleration of the seat substantially equal to a predetermined rate of acceleration.

16. The vehicle seat assembly according to claim 15, wherein said controller accelerates the seat to a controlled speed and controls the controlled speed by determining an actual speed of the seat utilizing the feedback control loop, comparing the actual speed to a predetermined speed, and adjusting operation of the motor to maintain the actual speed substantially equal to the predetermined speed.

17. The vehicle seat assembly according to claim 15, wherein said controller decelerates the seat at a controlled rate of deceleration adjusting operation of the motor to maintain an actual rate of deceleration substantially equal to a predetermined rate of deceleration.

18. The vehicle seat assembly according to claim 15, wherein the sensor includes a Hall-effect device which senses at least one of the position of said seat relative to said path and rotation of an output shaft of said motor.

19. The vehicle seat assembly according to claim 15, wherein the sensor includes a potentiometer which senses at least one of the position of said seat relative to said path and rotation of an output shaft of said motor.

20. A vehicle seat assembly comprising, a seat movable along a path;

a motor for driving the seat on said path;

a sensor generating a signal indicating movement of the seat on said path;

a controller operating said motor to move said seat along said path and in communication with said sensor to receive said signal to form a feed-back control loop;

wherein said controller accelerates said seat at a controlled rate of acceleration to a controlled speed and decelerates said seat from the controlled speed at a controlled rate of deceleration;

wherein said controller controls the controlled rate of acceleration of the seat by adjusting operation of the motor to maintain an actual rate of acceleration of the seat substantially equal to a predetermined rate of acceleration;

wherein said controller controls the controlled speed of the seat by determining an actual speed of the seat utilizing the feedback control loop, comparing the actual speed to a predetermined speed, and adjusting operation of the motor to maintain the actual speed substantially equal to the predetermined speed; and wherein said controller controls the controlled rate of deceleration of the seat by adjusting operation of the motor to maintain an actual rate of acceleration of the seat substantially equal to a predetermined rate of deceleration.

* * * * *